United States Patent [19]
Prenger et al.

[11] Patent Number: 5,911,933
[45] Date of Patent: Jun. 15, 1999

[54] METHOD FOR PRODUCING A THERMOPLASTIC TUBULAR PROFILE AND INTERNAL COOLING UNIT FOR SUCH A METHOD

[75] Inventors: Jan Hendrik Prenger, Hardenberg; Jan Visscher, Lutten, both of Netherlands

[73] Assignee: Wavin B.V., Zwolle, Netherlands

[21] Appl. No.: 08/875,614

[22] PCT Filed: Jan. 29, 1996

[86] PCT No.: PCT/NL96/00044

§ 371 Date: Jul. 31, 1997

§ 102(e) Date: Jul. 31, 1997

[87] PCT Pub. No.: WO96/23644

PCT Pub. Date: Aug. 8, 1996

[30] Foreign Application Priority Data

Feb. 1, 1995 [NL] Netherlands ............................ 9500182

[51] Int. Cl.$^6$ ............................ B29C 47/00; B29C 47/90
[52] U.S. Cl. .................................... 264/209.3; 264/209.4; 264/209.5; 425/192 R; 425/377; 425/378.1; 425/380
[58] Field of Search ................................ 264/209.3, 209.4, 264/209.5; 425/192 R, 377, 378.1, 380

[56] References Cited

U.S. PATENT DOCUMENTS 5,132,062  7/1992  Brambilla .

FOREIGN PATENT DOCUMENTS

| 1 422 325 | 1/1976 | United Kingdom . |
|---|---|---|
| WO 91/00798 | 1/1991 | WIPO . |
| WO 94/05482 | 3/1994 | WIPO . |

*Primary Examiner*—Leo B. Tentoni
*Attorney, Agent, or Firm*—Blank Rome Comisky & McCauley LLP

[57] ABSTRACT

A tubular profile made of thermoplastic material is formed by extrusion from an extruder. Downstream from the extruder, the tubular profile is cooled both externally and internally by an external cooling unit and an internal cooling unit mounted on the extruder. A tensile force is exerted on the cooled tubular profile downstream from the cooling units by a pulling device. When the extruder is set in operation to start the production of the tubular profile, the internal cooling unit is left out. When the pulling device applies the tensile force on the extruded and externally cooled tubular profile, the internal cooling unit is introduced into the tubular profile from the open end of the tubular profile and is mounted on the extruder.

9 Claims, 1 Drawing Sheet

METHOD FOR PRODUCING A THERMOPLASTIC TUBULAR PROFILE AND INTERNAL COOLING UNIT FOR SUCH A METHOD

FIELD OF THE INVENTION

The present invention relates to a method for producing a tubular profile from thermoplastic material, in which the tubular profile is extruded during normal production using an extruder which comprises an internal mandrel, the tubular profile emerging from the extruder is cooled externally and internally, respectively, downstream of the extruder with the aid of an external cooling device and an internal cooling device which comprises an internal cooling unit mounted on the internal mandrel of the extruder, and a tensile force is exerted on the tubular profile downstream of the external cooling device by means of a pulling device which acts externally on the tubular profile.

DESCRIPTION OF RELATED ART

Such a method is disclosed for example, in NL-A-7605758. The use of internal cooling in the extrusion of tubular profiles made of thermoplastic material has the important and also generally known advantage that the necessary cooling of the tubular profile emerging from the extruder proceeds much more expediently and rapidly than if the tubular profile were to be cooled exclusively from the outside. As a result, the occurrence of an unfavourable internal stress distribution in the synthetic material of the tubular profile can be avoided, particularly in the case of thick-walled profiles.

The use of internal cooling during the production of thermoplastic tubular profiles is also disclosed in WO 94/05482. Both in the case of the method described in this publication and in the method according to NL 7605758, use is made for the internal cooling of an internal cooling unit which can be coupled to an internal mandrel of the extruder and which has outside dimensions which are less than the inside dimensions of the extruded tubular profile. A gap therefore remains free between the internal cooling unit and the tubular profile to be cooled, there being circulated through said gap cooled air which removes the heat from the tubular profile and delivers it to a cooling system incorporated in the internal cooling unit and being cooled by a liquid.

In these known methods, the presence of a gap between the tubular profile to be cooled and the internal cooling unit is not only required for establishing the air flow. The gap also provided to overcome a typical problem related to the use of internal cooling. Said problem occurs in practice in starting up the method according to the preamble.

The problem in starting up an extrusion process with internal cooling is that the tubular profile emerging from the extruder has to be passed over the internal cooling unit mounted on the extruder. WO 94/05482 describes how the extruder is initially set in operation during starting up without the internal cooling unit being mounted on the extruder and how the fitting of the internal cooling unit is delayed until the extrusion process has stabilized. The soft tubular profile is then cut through immediately downstream of the extruder head and the internal cooling unit is mounted on the extruder. The tubular profile then slides over the internal cooling unit as a result of the progress of the extrusion.

As long as the cooling is not operative, the tubular profile in the region adjoining the extruder, is only slightly cooled, particularly on the inside, and is consequently soft and has little or hardly any shape retention. As a result, there is an appreciable risk that the still soft tubular profile comes into contact with the relatively cold internal cooling unit and gets stuck or adheres thereto, possibly with the consequence that the tubular profile splits open at that point or will no longer pass over the internal cooling unit at all. After all, at the instant when the internal cooling unit has to be passed, the tubular profile has still not reached the pulling device and no force can as yet be exerted by the pulling device to help the tubular profile over the internal cooling unit.

GB 1 422 325 discloses an extrusion process wherein the extruded tube emerges vertically downward from the extruder. The extruded tube is cooled internally by an internal cooling unit mounted on the internal mandrel of the extruder. The intercooling unit has sealing elements situated a distance from one another, which act in a sealing manner on the inside wall of the extruded tube. Water is circulated in the cavity bounded by the inside wall of the extruded tube and the sealing elements.

As is disclosed in example 1 of GB 1 422 325 the extruder is started-up with the internal cooling unit mounted on the extruder. To prevent the hot and soft extruded tube from sticking onto the internal cooling unit a pressurized gas is introduced in the space inside the tube between the extruder and the adjacent sealing element.

This known start-up procedure is ineffective when the extruded tube emerges horizontally from the extruder which is the common position for an extruder. In particular a pressurized gas will not be able to prevent the soft tube from collapsing before it reaches the sealing element adjacent the extruder.

SUMMARY OF THE INVENTION

The object of the present invention is therefore to eliminate the abovementioned drawback by disclosing measures which make a problem-free start-up of the production possible.

For this purpose, the present invention provides a method which is characterized in that the method has a start-up procedure comprising the following steps:

the setting in operation of the extruder without the internal cooling unit being mounted on the internal mandrel of the extruder, the extrusion of the tubular profile and the bringing of the pulling device into engagement with the tubular profile which is optionally cooled by the external cooling device, and when the pulling device is engaged with the tubular profile, introducing the internal cooling unit into the tubular profile at a point situated downstream of the pulling device and attaching it to the internal mandrel of the extruder.

In this start-up procedure, contact between the tubular profile and the internal cooling unit when fitting the latter is not a problem. This is due, on the one hand, to the fact that the external cooling device can already be operative during the fitting of the internal cooling unit, as a result of which the tubular profile already has some shape retention. Furthermore, the tubular profile is, as it were, securely held by the pulling device when the internal cooling unit is inserted into the tubular profile. An important advantage of the method according to the invention is that it is now possible to use, without problems, an internal cooling unit which has parts which make contact with the inside wall of the tubular profile to be cooled during normal operation.

These may be, for example, sealing elements which are conventional in the case of internal cooling with the aid of direct contact of the tubular profile with circulating liquid coolant.

Preferably an auxiliary tool which can be coupled to the internal cooling unit is used to insert the internal cooling unit into the tubular profile and, after the internal cooling unit has been mounted on the extruder, the auxiliary tool is removed from the tubular profile.

The present invention also relates to an internal cooling unit for performing the method involving internal cooling by means of direct contact of the tubular profile with liquid coolant (in most cases water) and to an auxiliary tool for fitting the internal cooling unit,

BRIEF DESCRIPTION OF THE DRAWING

The invention will be explained in greater detail below by reference to the drawing. In the latter.

DETAILED DESCRIPTION OF THE PREFERRED EMBODIMENTS

Figure 1:
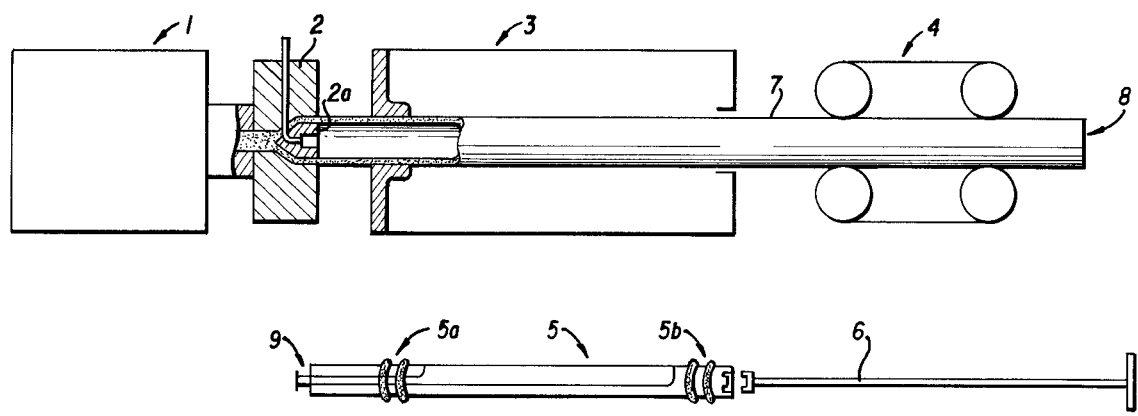
FIG. 1 shows diagrammatically an exemplary embodiment of the installation for performing the method according to the invention.

In FIG. 1, the reference numeral 1 indicates an extruder for thermoplastic synthetic material having an extruder head 2 with an internal mandrel 2a. A sizing and external cooling device 3 is disposed downstream of the extruder 1 and a pulling device 4 is situated downstream of the device 3.

FIG. 1 furthermore shows an internal cooling unit 5 having seals 5a and 5b which make sealing contact with the inside of extruded tubular profile 7 when the internal cooling unit 5 is situated in the tubular profile 7. An auxiliary tool 6 for fitting the internal cooling unit 5 is also shown.

In the method according to the invention, the procedure is as follows.

The extruder 1 first set in operation, as a result of which the tubular profile 7 made of thermoplastic material is forced outwards from the extruder head 2. In this connection, it is pointed out that it is sometimes desirable to use a synthetic material other than the finally in tended synthetic material for producing synthetic-material tubular profiles during the start-up procedure of an extrusion process, which "start-up material" has a better stability at high temperatures.

In the course of time, the tubular profile 7 emerging from the extruder 1 reaches a length which is such that the tubular profile 7 arrives at the pulling device 4. Up to that instant in the start-up procedure, use is preferably made of a resilient element such as a wire or rope which is fitted between the pinched and of the tubular profile 7 and a pipe (not shown) placed in the pulling device 4. As a result of setting the pulling device 4 in operation, the tubular profile 7 is then pulled. The siring and external cooling device 3 is preferably already operative when the tubular profile 7 reaches said device 3.

When the tubular profile 7 has been advanced far enough, the pulling device 4 is brought into contact with the tubular profile 7 and set in operation. The invention then provides for the internal cooling unit 5 to be inserted in the open end (at 8) of the tubular profile 7 at a point downstream of the pulling device 4. In this connection, it will often be necessary to remove the foremost part of the tubular profile 7 because it is pressed in on itself or twisted. In order to insert the internal cooling unit 5 into the tubular profile 7 up to the extruder head 2, use is made of the rod-shaped auxiliary tool 6. Preferably during the insertion of the internal cooling unit 5 into the tubular profile 7, the extruder 1, the external cooling device 3 and the pulling device 4 normally remain in operation. The internal cooling unit 5 can then be mounted on the extruder head 20 in this example the internal cooling unit 5 is provided with a screw thread (at 9) and the internal mandrel 2a of the extruder head 2 is provided with an associated bore having internal screw thread (not shown). The internal cooling unit 5 is screwed to the internal mandrel 2a by the extruder head 2 by rotating the auxiliary tool 6 which is detachably coupled to the internal cooling unit 5.

The extruder 1, the extruder head 2 and the internal cooling unit 5 are designed in a manner not shown for supplying and removing coolant so that a circulation of coolant can be maintained in the cavity which is bounded during operation by the seals 5a and 5b of the internal cooling unit 5 and the tubular profile 7, with which coolant heat can be removed from the tubular profile 7. Preferably, the coolant is water.

The insertion of the internal cooling unit 5 at 8 into the tubular profile 7 is not a problem because the tubular profile 7 can already be cooled at this point to such an extent that it has adequate shape retention and is rigid. The force which is exerted on the tubular profile 7 during the insertion of the internal cooling unit 5 into the latter is also not a problem because the tubular profile 7 is now already being conveyed by the pulling device 4.

After the internal cooling unit 5 has been mounted on the extruder 1, the auxiliary tool 6 is removed and the internal cooling of the tubular profile 7 is started with the aid of the internal cooling unit 5.

Figure 2:
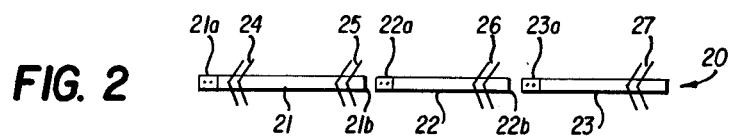
FIG. 2 shows diagrammatically an internal cooling unit according to the invention.

FIG. 2 shows another embodiment of an internal cooling unit suitable for performing the method according to the invention. This internal cooling unit 20 has a rigid body which can be assembled from three parts 21, 22 and 23. The first part 21 is provided with two seals 24 and 25, the second part 22 is provided with a seal 26 and the third part also has a seal 27. The seals 24, 25, 26, 27 make sealing contact with the inside wall of the tubular profile during the production of the tubular profile with internal cooling. The parts 21, 22 and 23 are provided with diagrammatically indicated coupling means, the coupling means 21a serving to couple it to the internal mandrel 2a of the extruder head 2 of extruder, and the coupling means 21b, 22a and 22b, 23a serving to mutually couple the parts 21, 22 and 23.

In the method according to the invention, it is possible first to insert the part 21 into the tubular profile 7 and couple it to the extruder 1, then to couple part 22 to part 21 and finally part 23 to part 22. This simplifies the fitting of the internal cooling unit 20.

Not shown in FIG. 2 is the fact that a plurality of pairs of conduits which each belong to a cavity between two seals are incorporated in the internal cooling unit 20. Said conduits connect to associated conduits in the extruder by means of which conduits it is possible to regulate accurately the degree of cooling in each cavity.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. Method for producing a tubular profile made of thermoplastic material, in which the tubular profile (7) is extruded during normal production using an extruder (1) having an extruder head which comprises an internal mandrel, the tubular profile emerging from the extruder head is cooled externally and internally, respectively, downstream of the extruder head with the aid of an external cooling device (3) and an internal cooling device (5) which comprises an internal cooling unit mounted on the internal mandrel of the extruder head, and a tensile force is exerted on the tubular profile downstream of the external cooling device (3) by means of a pulling device (4) which acts externally on the tubular profile, characterized in that the method has a start-up procedure comprising the following steps:

setting in operation the extruder (1) without the internal cooling unit (5) being mounted on the internal mandrel of the extruder head, extruding the tubular profile (7) and bringing the pulling device (4) into engagement with the tubular profile, and when the pulling device (4) is engaged with the tubular profile (7), introducing the internal cooling unit into the tubular profile at a point situated downstream of the pulling device and attaching the internal cooling unit to the internal mandrel of the extruder head.

2. Method according to claim 1 wherein an auxiliary tool (6) which is coupled to the internal cooling unit (5) used to insert the internal cooling unit into the tubular profile (7) and, after the internal cooling unit has been mounted on the internal mandrel of the extruder (1), the auxiliary tool is removed from the tubular profile.

3. Internal cooling unit (5;20) adapted to be mounted on an internal mandrel of an extruder head of an extruder (1,2) for producing a tubular profile (7) made of thermoplastic material, the extruded tubular profile emerging from the extruder head (1,2) being pulled by a pulling device (4) downstream of the extruder head, the internal cooling unit comprising an elongated rigid body provided with coupling means (9;21a) for forming a detachable coupling to the internal mandrel and with sealing elements (5a,5b;24,25,26, 27) which are situated a distance from one another and which are adapted to act in a sealing manner on an inside wall of the extruded tubular profile so that at least one cavity is formed bounded by two said sealing elements and the inside wall of the extruded tubular profile, the internal cooling unit further comprising conduit means which, in normal operation, connect to conduit means in the internal mandrel of the extruder head for maintaining a circulation of liquid coolant in each said cavity, characterized in that, the coupling means (9;21a) are adapted to mount the internal cooling unit on the internal mandrel after the internal cooling unit has been inserted at a point (8) downstream of the pulling device (4) into the extruded tubular profile (7) emerging from the extruder.

4. Internal cooling unit account to claim 3, wherein a number of said sealing elements (24,25,26,27) is three or more in order to form a plurality of said cavities in sequence in an extrusion direction.

5. Internal cooling unit according to claim 4, wherein the conduit means comprise a separate supply conduit and removal conduit for each said cavity.

6. Internal cooling unit according to claim 3, wherein the rigid body comprises a plurality of component bodies which are provided with interacting detachable couplings for fitting the component bodies in the tubular profile one by one.

7. Internal cooling unit according to claim 4, wherein the rigid body comprises a plurality of component bodies which are provided with interacting detachable couplings for fitting the component bodies in the tubular profile one by one.

8. Internal cooling unit according to claim 5, wherein the rigid body comprises a plurality of component bodies which are provided with interacting detachable couplings for fitting the component bodies in the tubular profile one by one.

9. Method according to claim 1, wherein said step of extruding the tubular profile and bringing the pulling device into engagement with the tubular profile comprises cooling the tubular profile by the external cooling device.

* * * * *